Figure 1:
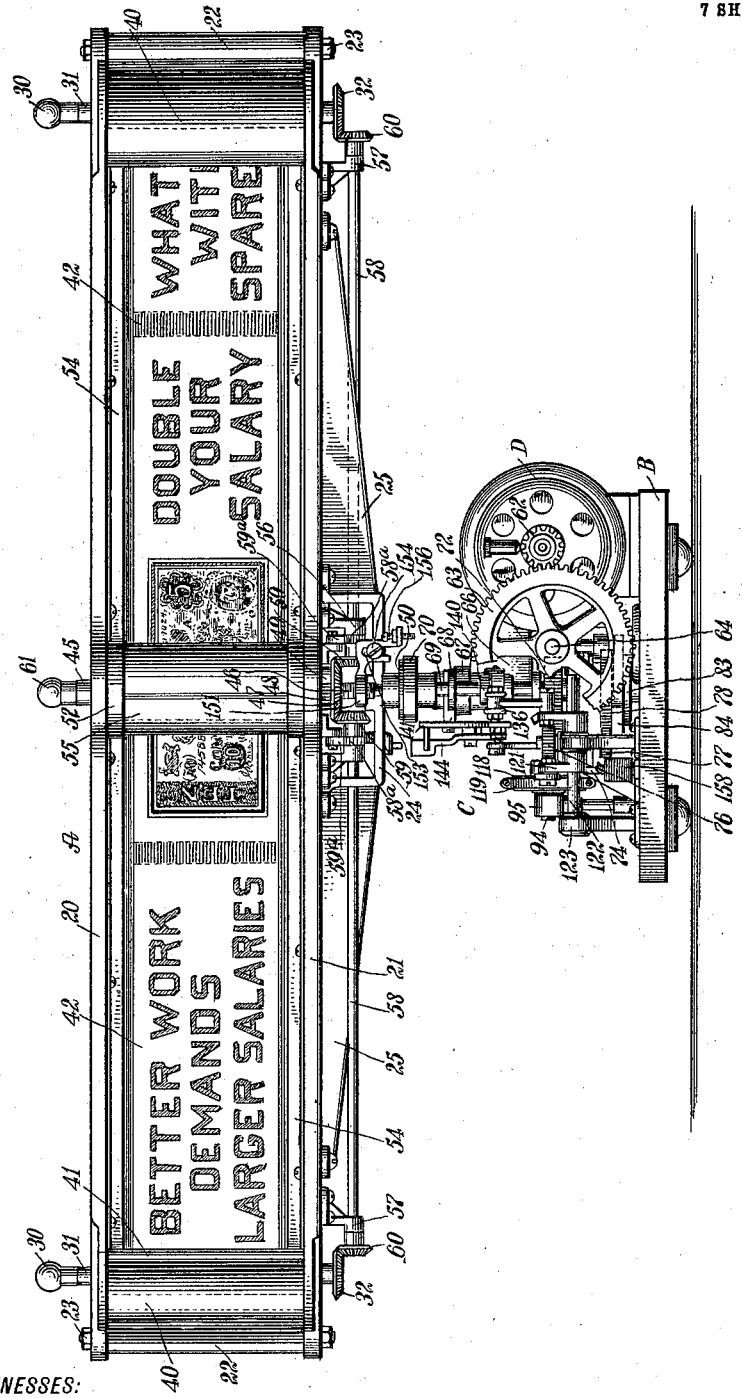

H. A. ARMSTRONG.
ADVERTISING DEVICE.
APPLICATION FILED FEB. 16, 1910.

1,000,318.

Patented Aug. 8, 1911.
7 SHEETS—SHEET 2.

WITNESSES:

INVENTOR
Henry A. Armstrong
BY
ATTORNEYS

H. A. ARMSTRONG.
ADVERTISING DEVICE.
APPLICATION FILED FEB. 16, 1910.

1,000,318.

Patented Aug. 8, 1911.
7 SHEETS—SHEET 4.

WITNESSES:

INVENTOR
Henry A. Armstrong
BY
ATTORNEYS

H. A. ARMSTRONG.
ADVERTISING DEVICE.
APPLICATION FILED FEB. 16, 1910.

1,000,318.

Patented Aug. 8, 1911.
7 SHEETS—SHEET 5.

WITNESSES:

INVENTOR
Henry A. Armstrong
BY
ATTORNEYS

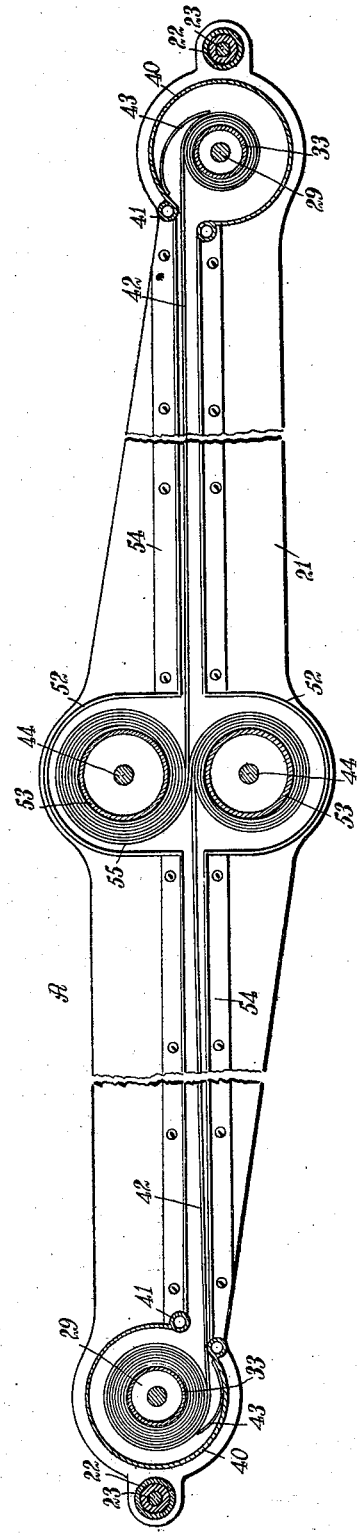

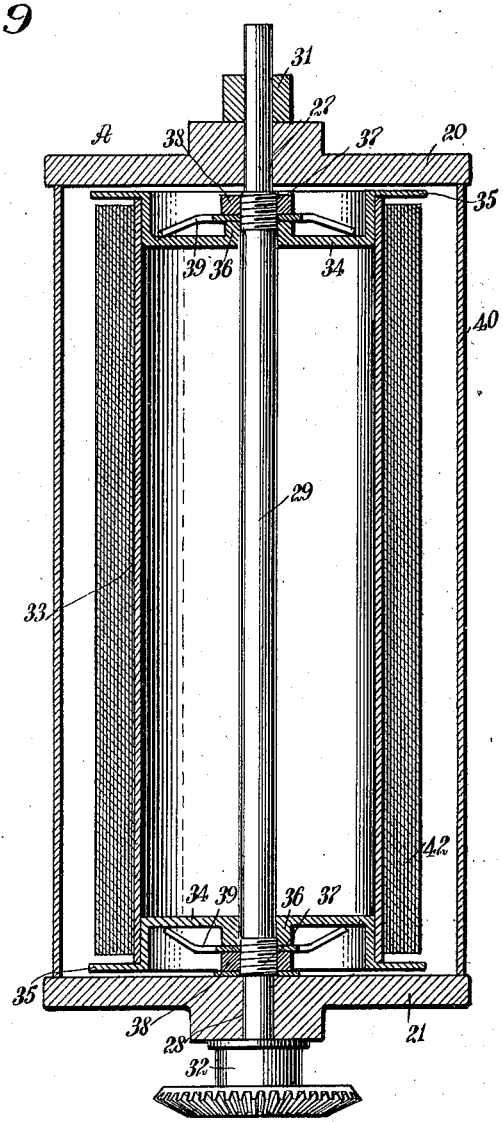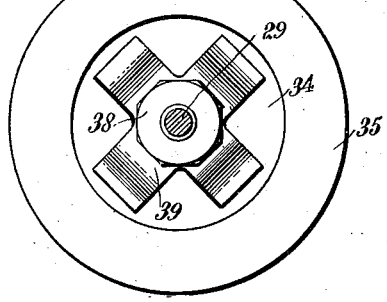

UNITED STATES PATENT OFFICE.

HENRY A. ARMSTRONG, OF NEW YORK, N. Y.

ADVERTISING DEVICE.

1,000,318.  Specification of Letters Patent.  Patented Aug. 8, 1911.

Application filed February 16, 1910. Serial No. 544,246.

*To all whom it may concern:*

Be it known that I, HENRY A. ARMSTRONG, a citizen of the United States, and a resident of the city of New York, borough of Manhattan, in the county and State of New York, have invented a new and Improved Advertising Device, of which the following is a full, clear, and exact description.

This invention relates to advertising devices, and has reference more particularly to a device of this class in which a movable series of advertisements, notices, or other announcements, publications or the like, are successively presented to view, and which has means for advancing the series of advertisements and for reversing the direction of movement of the same, automatically, so that the series can be repeated.

An object of the invention is to provide an advertising device by means of which verbal, pictorial, or other advertisements and the like can be presented to view, which includes, for its operation, mechanism in itself, apt to attract attention, and which is simple, compact, and mechanically efficient.

A further object of the invention is to provide an advertising device in which series of advertisements are arranged to travel, and in which means are provided for causing an optical delusion, whereby the character of the advertisements changes while in view of the observers.

A still further object of the invention is to provide a device of the class described, which can be driven by means of any suitable motor, preferably an electrical one, which is completely automatic in operation, which can be used in shop windows or other places where it can be exhibited, which can be easily carried from place to place, and in which the advertisements can be changed without difficulty.

Another object of the invention is to provide an advertising device in which series of advertisements are presented to view, successively, in which the series are automatically reversed and run in the opposite direction, so that the machine is continuously in operation, in which the advertisements are indicated in any suitable manner upon bands or strips of flexible material, and in which both sides of these strips are available for advertising purposes.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 2:
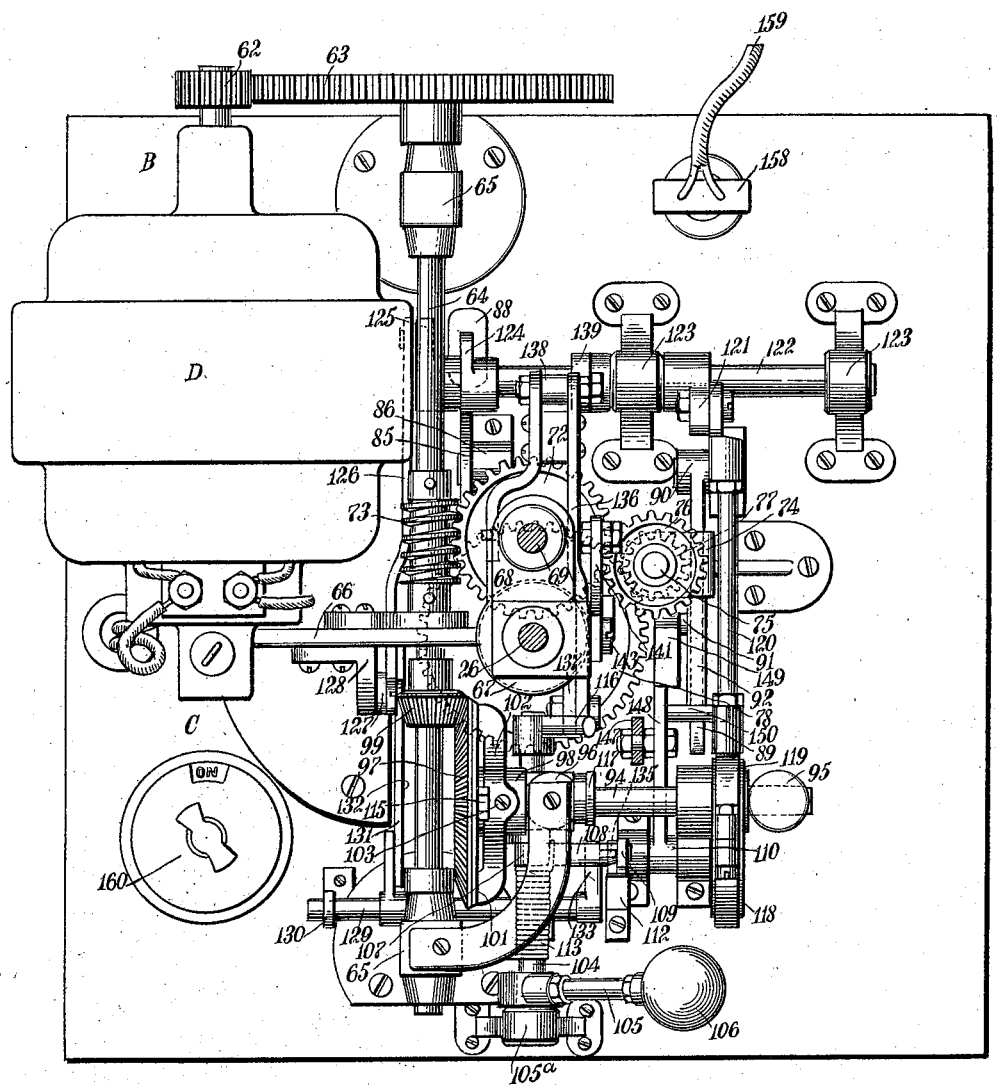
Figure 3:
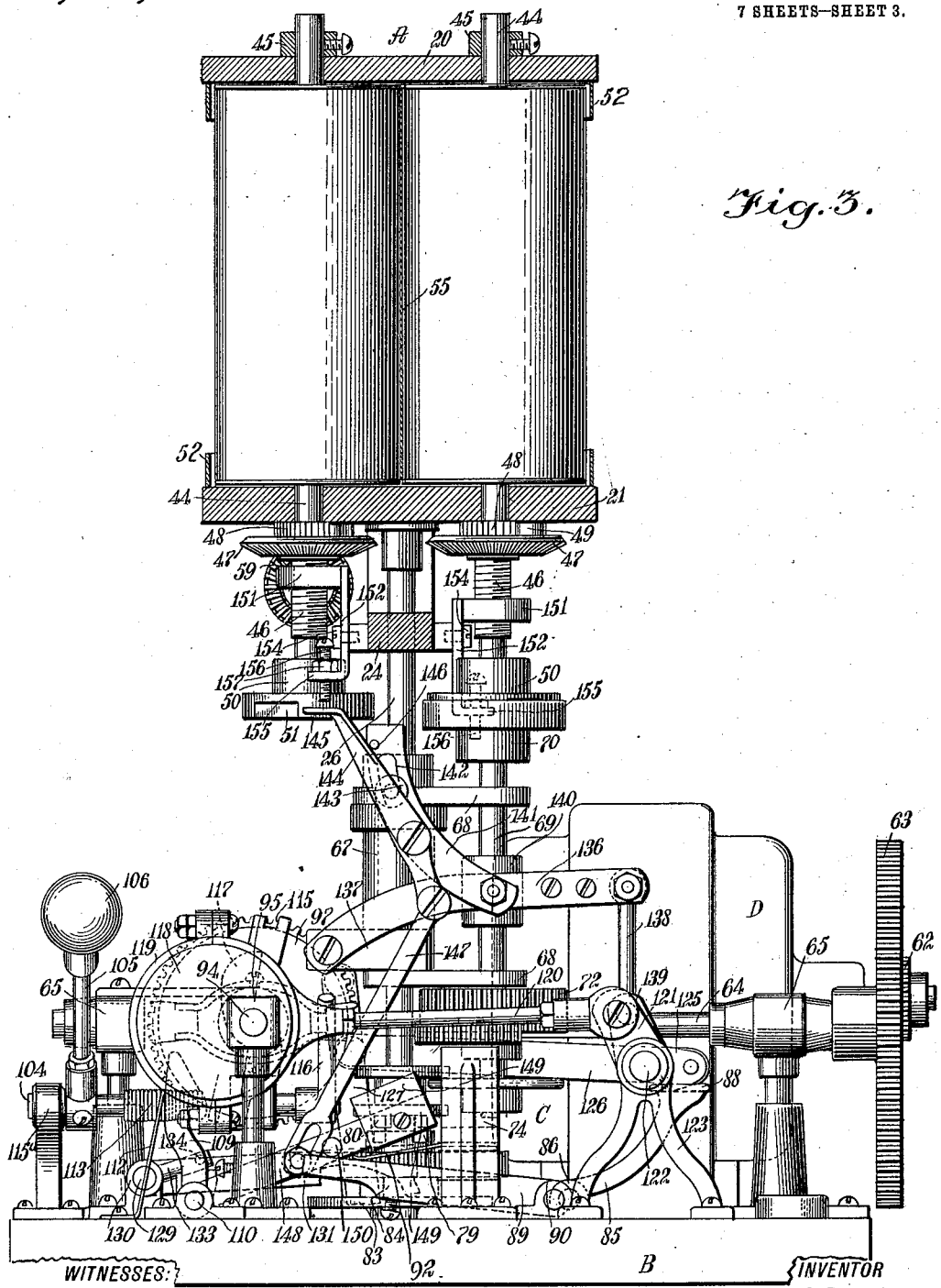
Figure 4:
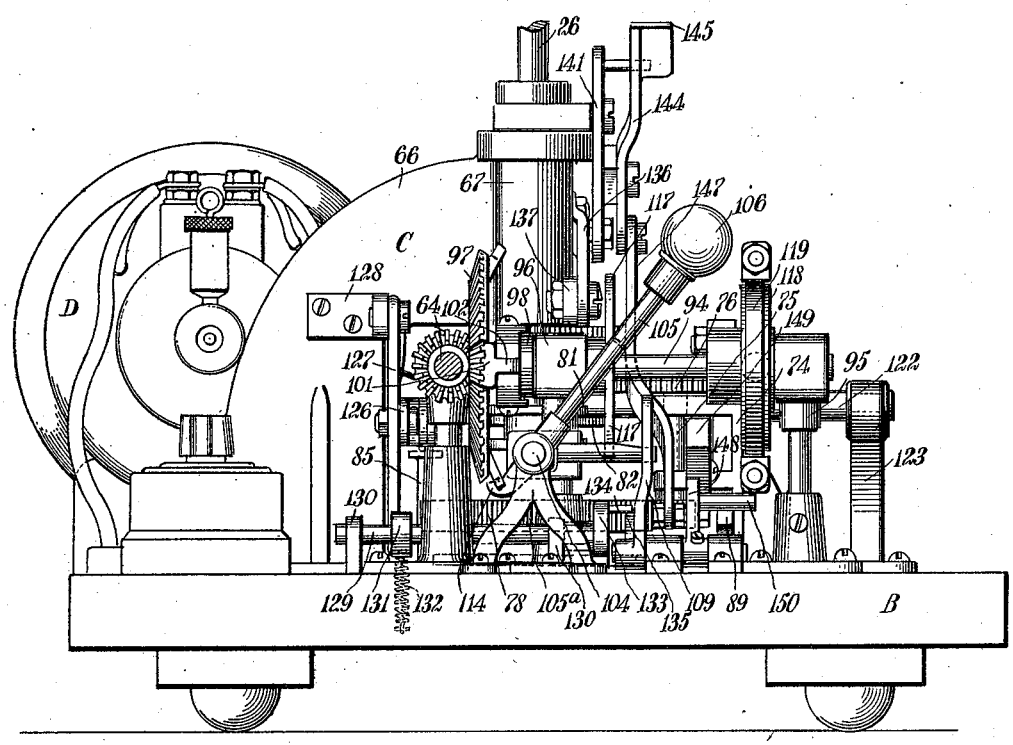
Figure 5:
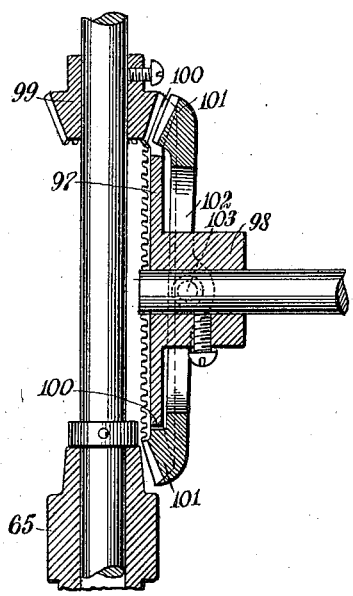
Figure 6:
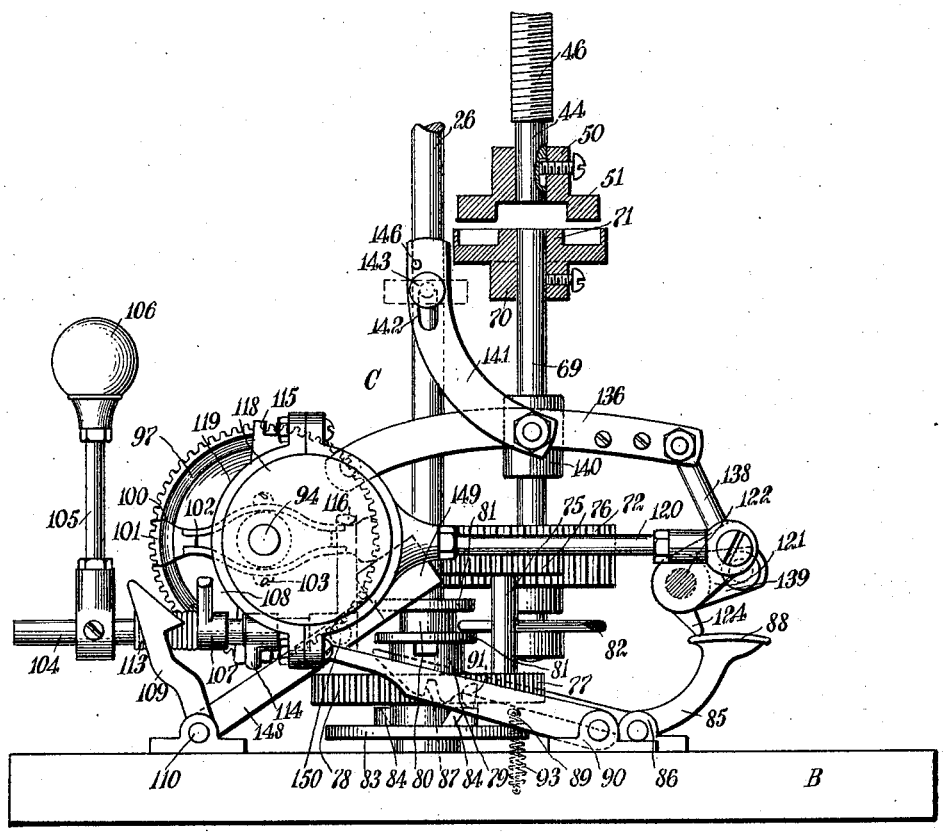
Figure 7:
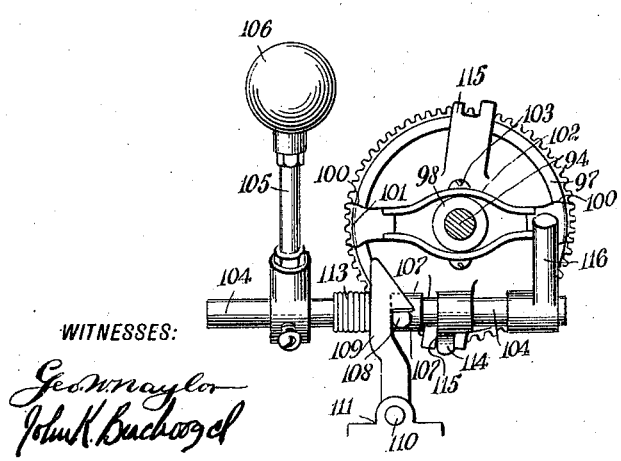

Figure 1 is a front elevation of an embodiment of my invention; Fig. 2 is a horizontal section of the device, showing the mechanism controlling its operation; Fig. 3 is a vertical section of the device; Fig. 4 is a side elevation of the lower part of the device, showing the mechanism controlling its operation; Fig. 5 is a longitudinal section of a detail of the operating mechanism; Fig. 6 is a vertical section of part of the operating mechanism; Fig. 7 is a transverse section showing in end elevation, the detail shown in Fig. 5; Fig. 8 is a horizontal section showing the bands or strips upon which the advertisements are depicted, and the rolls upon which they are wound, together with the means for guiding them; Fig. 9 is an enlarged, longitudinal section of one of the rolls upon which the strips or bands are wound; and Fig. 10 is an end view of one of the rolls, showing the spindle thereof in section.

Before proceeding to a more detailed explanation of my invention, it should be clearly understood that while this device is designed primarily for the purpose of displaying advertisements, it can also be advantageously employed for other, similar purposes, in which it is necessary or desirable to display, successively, announcements, pictures, or the like, which are arranged in series. While the device is particularly useful as an advertising machine, in displaying advertisements printed or otherwise indicated upon the strips or bands, the mechanism itself, which effects the automatic operation and control of the bands, serves to attract attention. The machine is sufficiently compact so that it can be conveniently located in a shop window or other place adapted for its display. I prefer to employ an electric motor for its operation, but this and others of the details of construction can be varied in accordance with individual preference and special conditions, without departing from the underlying spirit of the invention.

Referring more particularly to the drawings, I provide a frame A, comprising upper and lower elongated members 20 and 21, which are spaced a suitable distance apart, corresponding approximately to the width of the advertisement-bearing strips or bands, and connected at the extremities by means of tubular end-pieces 22, through which pass retaining bolts 23. The frame A is positioned above a suitable base B upon which the operating and controlling mechanism C is mounted. Underneath the lower member 21, and central with respect thereto, is a downwardly-extending U-shaped yoke or bracket 24. Inclined bracing rods or flanges 25 extend from the ends of the yoke, longitudinally, toward the extremities of the lower member 21 and are preferably integral therewith. The yoke 24 may be bolted or otherwise fastened underneath the member 21. These, like the others of the parts of the device, are preferably fashioned from cast-iron or other metal adapted for the purpose. A main supporting shaft 26 is located underneath the frame A, in a substantially vertical position, being secured to the lower member 21 and to the woke 24, through an opening of which it passes. As will appear hereinafter, the main supporting shaft is mounted upon the base B and is connected with the operating mechanism.

At each end, the upper and lower frame members have, respectively, bearings 27 and 28, in which are journaled spindles 29, projecting above the upper member, and below the lower member, as is indicated most clearly in Fig. 9. Ornaments 30, of and suitable form may be mounted at the upper, projecting ends of the spindles 29, which are provided with retaining collars 31. At the lower, projecting ends, are bevel gears 32 rigidly mounted upon the spindles, and serving a purpose which will appear hereinafter. Cylindrical rolls 33 are carried by the spindles 29 and have associated therewith, heads 34 seating within the ends of the rolls and having laterally extending flanges 35 and substantially central hubs 36 through which the spindles 29 pass. The latter have threaded parts 37 upon which are secured retaining nuts 38. These secure in place spiders 39 having laterally disposed spring extensions which engage the heads 34, and tend to hold them in position within the ends of the cylindrical rolls 33. A casing 40 surrounds each roll 33 and is secured in place between the upper and lower frame members. It has beaded, longitudinal edges 41 spaced apart to permit the advertising strips or bands 42 to pass therethrough in winding upon, or unwinding from the rolls. Within each casing is a spring member 43 which normally engages the band upon the roll, and serves to maintain it taut in the operation of the machine.

At the middle of the frame A, the frame members are outwardly extended and have journaled in suitable bearings thereof, spaced, vertical spindles 44, the upper ends of which project through the upper member 20 and have retaining collars 45 held in place by set screws or the like. At the upper ends they may carry suitable ornaments 61. The lower ends of the spindles 44 project downwardly through the lower member 21, and have threaded parts 46. Above the latter they loosely carry bevel gears 47, and have rigidly associated therewith, ratchets 48. Dogs 49 are pivotally mounted upon the upper faces of the bevel gears 47 and operatively engage the ratchets. At the lower end each spindle 44 carries a clutch member 50 which is constrained to turn with the spindle, and has a limited sliding movement longitudinally thereof. It is provided in its lower face with a recess 51, for a purpose which will appear hereinafter. Semi-cylindrical rims 52 are carried by the upper and lower members of the frame A, around the rolls 53 carried by the spindles 44, and have the open sides toward each other. Spaced guides 54, of angular or other cross section, are screwed or otherwise fastened at the adjacent sides of the upper and lower frame members, and extend from the rims 52 to the casings 40, and serve to guide the edges of the advertisement-bearing bands. A flexible band or strip 55 operatively connects the rolls 53, being wound in opposite directions upon the rolls. It consists preferably of sheet metal such as brass, and serves a purpose which will appear hereinafter.

Bearing brackets 56 and 57 are mounted at the under side of the lower frame member 21, adjacent respectively, to the spindles 44 and 29. Shafts 58 are journaled therein, and at the ends have bevel gears 59 and 60 which mesh respectively, with bevel gears 47 and 32, so that the rolls 53 and 33 are operatively connected. The shafts, near their adjacent ends have ratchets 58[a] engaged by dogs 59[a] pivotally secured to the under side of the lower frame member 21, to prevent the rotation of the shafts 58 in one direction. The rolls 53 are each alined with one of the rolls 33, and the advertisement-bearing strips 42 are wound respectively upon one of the rolls 33 and upon one of the rolls 53, so that, as is shown in Fig. 8, they are substantially alined. Each strip wound upon a roll 53 is wound between a layer of the flexible connecting band 55, which operatively connects the rolls 53. When the device is viewed from one side or the other, it would appear that a single advertisement-bearing band extends from one end of the frame A to the other, passing between the rims 52, and the apparent metal rolls, the appearance of which the connecting band 55 lends to the rolls 53 with the strip wound thereon. Hence, as a strip 42 is wound upon one roll 33, and the second strip 42 is wound upon the other roll 33, it appears that a single strip travels from one end of the frame to the other, so that if the advertisements or other representations are designed in accordance, they will apparently change in appearance merely by passing between the central rolls. As is shown, for example, in Fig. 1, a representation of a bank-note of one denomination may be caused to change into a representation of a band-note of a different denomination. Again, a phrase printed in one color may appear to change to another color. In this way an optical delusion is provided, which will attract attention to the advertisements, and afford amusement and entertainment to the observer.

A motor D, of any suitable form is mounted upon the base B, and has a driving pinion 62 in mesh with a driven gear 63 carried by a main operating shaft 64, journaled in bearings 65 of the base. A carrier 66 is mounted upon the base and has at the end, a substantially vertical bearing 67 through which the main supporting shaft 26 passes. The carrier has laterally extended arms 68 forming bearings in which is journaled a vertical or auxiliary operating shaft 69. This has a limited sliding movement in the direction of its length, and at the upper end carries a socket 70 having a substantially central rib 71 formed to receive each of the members 50, the rib 71 operatively engaging in the recess 51, so that, as the shaft 69 is turned, the corresponding spindle 44 is likewise turned with it. At the lower end, the shaft 69 has a gear 72 in mesh with a worm 73 carried by the main, operating shaft 64.

The base B carries a bearing bracket 74, in which is journaled a countershaft 75 having at the upper and lower ends respectively, gears 76 and 77. The gear 76 is in mesh with the gear 72, the latter being of sufficient width so that when the shaft 69 is moved in the direction of its length within its limits, the gears do not become disengaged. The main supporting shaft 26, at the lower end, loosely carries a gear 78 in mesh with the gear 77. The gear 78 has associated therewith a clutch member 79 adapted to be engaged by a correspondingly formed clutch member 80 constrained to rotate with the shaft 26 and having a limited sliding movement thereupon. The clutch member 80 has spaced, laterally extending flanges or ribs 81 between which slidably engages a disk 82 rigidly carried at the lower end of the auxiliary operating shaft 69, for a purpose to appear hereinafter.

At the lower end, the main supporting shaft has a disk or plate 83 which is rigidly secured thereto, and has two diammetrically opposed, radially extending lugs 84. A lever 85 is pivotally mounted by means of a bearing 86, upon the base B, and has a recess 87 at one end, which is adapted to engage one of the lugs 84 to lock the shaft 26 against rotation. At the other end, the lever 85 is upwardly disposed and has a face 88, to serve a purpose to appear hereinafter. At the opposite side of the plate 83, an arm 89 is pivoted in a bearing 90 of the base, and has an extension 91 adapted to be engaged by the lugs 84 to raise the arm 89. A spring 92 secured to the bearing bracket 74 serves to maintain the arm 89 in a normal, operative position. The lever 88 is also held in a normal position by a spring 93.

A reversing shaft 94 is journaled in suitable bearing posts 95 and 96 of the base B, and has one end adjacent to the shaft 64, and is at substantially right angles thereto. It carries at this end a beveled gear 97 mounted thereon by means of a suitable hub 98. A beveled gear 99 is rigidly secured upon a shaft 64, and is adapted to mesh with the gear 97. The latter, at diametrically opposite points has cutaway parts 100, adjacent to which are located gear sections 101 formed at the ends of a yoke 102, pivotally mounted by means of trunnions 103 upon the hub 98.

A rock shaft 104 is journaled in a bearing of the post 96 and has rigidly secured thereto, an arm 105 provided with a weight 106. It carries a sleeve 107, provided with a finger 108 adapted to be engaged by a detent 109 carried by a spindle 110 journaled in bearings 111 of the base. A spring 112 tends to hold the detent 109 in an operative position. A coil spring 113 wound about the rock shaft 104, engages the sleeve 107 and any suitable, fixed support, such as one of the bearing posts, and tends to swing the finger 108 toward the bevel gear 97. The rock shaft 104 has a locking projection 114 adapted to be engaged within locking recesses 115 at diametrically opposite points of the bevel gear, to hold the same against rotation. The rock shaft 104 also has rigidly secured thereto, an arm 116 adapted to engage near one or the other of the ends of the yoke 102, to force a gear section into a recess 100 and into operative engagement with the bevel pinion 99 upon the shaft 64. The shaft 94 has oppositely disposed, similar cam arms 117 adapted to engage the finger 108 to operate the rock shaft, as will appear hereinafter. The shaft 94 also has an eccentric disk 118 rigidly secured thereon and having associated therewith, an eccentric ring 119, which has an eccentric rod 120 pivotally associated with a crank 121 of a shaft 122. The latter is journaled in suitable bearings 123 of the base B, and has a cam extension 124 adapted to be brought into operative engagement with the face 88 of the lever 85, as will appear hereinafter.

At the end adjacent to the face 88 it has a crank arm 125 pivotally connected by means of a link 126, with a pivoted thrust member 127, mounted upon a lug 128 of the carrier 66. The thrust member 127 is normally positioned so that its lower end is adjacent to one of the lugs 84 of the disk member 83, and thus serves to engage this member to rotate the disk 83 in one direction, as will appear hereinafter.

A rock shaft 129 is journaled in bearings 130 of the base, and is positioned under the shaft 64, and adjacent to the shaft 94. It has a rigid arm 131 held in a normal position by a spring 132. It also has a locking finger 133 having a projection 134 adapted to engage in a recess 135 of the detent 109, to hold the same in an operative position. The arm 132 is operated by the lugs 84 to rock the shaft 129 so that the locking finger 134 is operatively positioned with respect to the detent 109.

A pivoted arm 136 is mounted upon an extension 137 of the carrier 66 and is connected by means of a link 138, pivotally mounted at the end thereof, with the crank arm 139 of the shaft 122. The arm 136 is operatively associated by means of a collar 140, with the vertical or auxiliary operating shaft 69, so that when the shaft 122 is turned, the auxiliary shaft 69 can be raised or lowered in accordance. A link 141 is pivotally secured to the arm 136, near the middle thereof, and has a guide slot 142 receiving a guide pin 143 mounted upon the carrier 66. A trip lever 144 is pivotally mounted upon the link 141 and has at its upper end a laterally disposed part 145. A stop 146 carried by the link 141 serves to limit the movement of the trip lever. The latter, at the lower end, is secured to a pivoted link 147, which in turn, is pivotally connected with an arm 148 rigid with the spindle 110, and having at the end a weight 149. The arm also has a laterally extending finger 150 which projects over the arm 89 and is adapted to be operatively engaged thereby. The connection between the link 147 and the arm 148 is preferably by means of a slot and pin, to allow for a certain play of the parts. Collars 151, threaded to correspond to the threaded parts 46, are mounted upon the latter, and have downwardly disposed extensions 152 provided with guide slots 153, movably receiving guide pins 154 of the yoke-bracket 24. The collars and extensions constitute trips adapted to engage the trip lever. The extensions 152 have, at the lower ends, laterally disposed parts 155 carrying trip screws 156 provided with lock nuts 157 so that the engagement of the trips with the trip lever can be regulated.

A suitable plug 158 is provided for connecting the current-supplying conductors 159. I also use a switch 160 of any suitable kind, by means of which the gear can be started and stopped.

When the advertising machine is in operation normally, one of the clutch members 50 is in operative engagement with the socket 70, and the corresponding spindle 44 is thus operated by the vertical operating shaft 69, which in turn is driven from the shaft 64, through the gear 72 and the worm 73. The shaft 64, it will be understood, is driven by the motor, through the connecting gearing. The rotation of the spindle 44 is transmitted to one of the spindles 29, by means of the shaft 58 and the gearing operatively connecting it with the spindles. Consequently, the bands or strips 42 will be unwound from a roll 53 and a roll 33, and wound upon the other, corresponding rolls. The rotation of the spindle 44 is transmitted to the other spindle 44 by means of the flexible band 55 connecting the rolls 53. The other shaft 58 is inoperative it will be understood, as its loose bevel gear 47 is not operatively connected with the spindle through the dog and ratchet. Consequently, the roll 33, from which the band 42 is being unwound, is not actuated, and merely turns with the unwinding of the band, the latter being held taut by the resistance of the roll and by the tension device 43.

The spindles 44 are turned in opposite directions. The rotation of these spindles causes the collars 151 to move longitudinally of the spindles, owing to the threaded engagement therewith. The arrangement is such that the spindle 44 from which the band is being unwound causes its collar 151 to move downward, while the other collar is being moved upward. The trip of the collar which moves downward is gradually brought into engagement with the laterally disposed end of the trip lever, and at a certain point of the operation of the machine the trip lever is actuated to raise the arm 148 to position the detent 109 inoperatively, and thereby to release the finger 108. This permits the rock shaft 104 to swing under the influence of the coil spring, so that the arm 116 comes into engagement with the yoke 102 at the end thereof adjacent to the bevel pinion 99. This movement of the arm 116 causes the bevel gear section at the end of the yoke to be forced into engagement with the pinion 99, whereupon the gear 97 is at once rotated through one-half of a revolution, until the other cutaway part 100 comes opposite to the bevel pinion 99.

The one-half revolution of the reversing shaft 94 is transmitted to the shaft 122 by means of the eccentric and the connecting rod. The movement of the shaft 94 brings one of the cam arms 117 into engagement with the finger 108 of the rock shaft 144, and turns the latter against the tension of the spring 113, until the finger 108 is again in operative engagement with the detent 109, whereby the shaft 104 and the parts associated therewith are held in their normal positions. The movement of the shaft 122 lowers the vertical operating shaft 69, so that the socket is disengaged from the clutch member 50. At the same time the cam extension 124 depresses the upwardly disposed end of the lever 85 and thus displaces the locking end of the lever from engagement with one of the lugs 84. At the same time, the thrust member 127 is swung away from the lugs 84 by means of the link 126, which connects it with the crank 125.

The downward movement of the auxiliary operating shaft permits the clutch member 80 to slide down into engagement with the clutch member 79, so that the gear 78 becomes operatively connected with the main supporting shaft 26. This gear, which is driven from the gear 72, through the gears 76 and 77, then turns the shaft 26 and thus rotates the entire frame A through one-half a revolution, that is, through 180°. When the disk member 83 approaches the end of one-half a revolution, one of the lugs 84 engages the extension 91 of the arm 89, and, passing under it, raises the arm. This, by operating the arm 148, swings the spindle 110 and operates the detent 109 to release the finger 108. The spring 113 then again forces the arm 116 against the end of the yoke, and thereby renders the bevel gear 97 operative with respect to the pinion 99. The result is that the reversing shaft 94 is again rotated through one-half a revolution, and the parts are returned to their original positions. The auxiliary operating shaft is raised by means of the shaft 122 so that the socket 71 is in operative engagement with the other clutch member 50, and the bands are operated in a reverse direction from that during the previous operation.

The thrust member 127, when the shaft 122 is again operated, is moved toward the carrier 66, and is brought into engagement with one of the lugs 84, and assists in rotating the disk member 83. The purpose of the thrust member is to facilitate the operation and to quicken the movement of the disk member should the other lug 84 not pass clear of the arm extension 91, with sufficient rapidity. The arm 131 is raised and lowered by the sliding engagement therewith of the lugs 84. When the disk member 83 is rotating, neither of the lugs 84 engages the arm 131, and it is lowered by the spring 132 so that the locking projection 134 engages in the recess 135 of the detent 109, to hold the latter against displacement during this operation of the device. It will be understood that the second half-revolution of the shaft 122 again raises the shaft 69, and thereby leaves the clutch member 81 out of engagement with the clutch member 79, which releases the gear 78 with respect to the shaft 26. At the same time the lever 85 is permitted to move under the tension of the spring 93, owing to the displacement of the cam extension 124, and comes into locking engagement with the second lug 84.

When the collar 151, which engages the end of the trip lever 144 has reached its lowest position, the other locking collar has reached its highest position, and consequently, when this spindle 44 is operatively connected with the shaft 69, the last-mentioned collar 151 must first be brought to its lowest position before it will operate the trip lever. The length of time necessary to move the collars from their upper to their lower positions depends upon the length of the threaded parts of the spindles 44, and the adjustment of the trips. This adjustment, it will be understood, must be in accordance with the lengths of the bands which it is desired to displace.

Having thus described my invention, I claim as new, and desire to secure by Letters Patent:—

1. A device of the class described, comprising a frame having independent and separate bands mounted to travel thereon, said bands being adapted to present advertisements adapted to coöperate and supplement each other, whereby a part of an advertisement of one band can be intelligibly associated with a part of an advertisement of the other band, means for causing said bands to travel, and automatic means for intermittently reversing said frame.

2. A device of the class described, comprising a base, a rotatable frame mounted upon said base, rolls carried by said frame, independent and separate bands arranged to be wound upon and unwound from said rolls, and adapted to have advertisements indicated thereon, said advertisements being adapted to coöperate and supplement each other, so that parts of the advertisements of said respective bands can be associated to form a complete advertisement, a motor, and mechanism connecting said motor and said frame, and serving to operate said rolls and to rotate said frame intermittently.

3. In a device of the class described, a frame, a pair of rolls journaled upon said frame, a second pair of rolls journaled upon said frame, two rolls of said pairs being adjacent, a flexible band connecting said adjacent rolls, advertisement-bearing bands wound upon said rolls of each of said pairs, mechanism for driving said rolls, and means for operatively connecting one of said rolls of each of said pairs, with one of said rolls of the other of said pairs.

4. In a device of the class described, a frame, a pair of rolls journaled upon said frame, a second pair of rolls journaled upon said frame, advertisement-bearing bands each arranged to extend from one of said rolls of one of said pairs to one of said rolls of the other of said pairs, and partly wound upon said rolls, means for operatively connecting rolls of said pairs, a flexible band connecting one of said rolls of one of said pairs and one of said rolls of the other of said pairs, and wound upon said rolls in opposite directions, and means for driving certain of said rolls to cause said advertisement-bearing bands to travel.

5. In a device of the class described, a frame, a pair of rolls journaled upon said frame, a second pair of rolls journaled upon said frame, advertisement-bearing bands each arranged to extend from one of said rolls of one of said pairs to one of said rolls of the other of said pairs, and partly wound upon said rolls, means for operatively connecting rolls of said pairs, a flexible band connecting one of said rolls of one of said pairs and one of said rolls of the other of said pairs, and wound upon said rolls in opposite directions, means for driving certain of said rolls to cause said advertisement-bearing bands to travel, and means for intermittently rotating said frame, said means for operating said rolls being inoperative when said frame is being rotated.

6. In a device of the class described, a pair of adjacent rolls, a band wound in opposite directions upon said rolls and operatively connecting the same, other rolls spaced respectively from one of said first rolls, advertisement-bearing bands, each extending from one of said first rolls to one of said last-mentioned rolls and wound partly upon the same, gearing operatively connecting each of said first-mentioned rolls and one of said last-mentioned rolls, a motor, and an operative connection between said motor and one of said first-mentioned rolls.

7. In a device of the class described, a pair of adjacent rolls, a band wound in opposite directions upon said rolls and operatively connecting the same, other rolls spaced respectively from one of said first rolls, advertisement-bearing bands, each extending from one of said first-mentioned to one of said last-mentioned rolls and wound partly upon the same, gearing operatively connecting each of said first-mentioned rolls and one of said last-mentioned rolls, said gearing being inoperative when each of said first-mentioned rolls is rotated in one direction, a motor, and means for operatively connecting said motor and either of said first-mentioned rolls.

8. In a device of the class described, a rotatable frame, a pair of adjacent rolls journaled upon said frame, a band wound in opposite directions upon said rolls, other rolls journaled upon said frame and spaced respectively from said first-mentioned rolls, advertisement-bearing bands wound upon said rolls, gearing operatively connecting each of said first-mentioned rolls with one of said last-mentioned rolls, a motor, gearing whereby said motor serves intermittently to rotate said frame, and means for operatively connecting said motor with either of said first-mentioned rolls.

9. In a device of the class described, a frame, a pair of rolls journaled upon said frame, a flexible band wound in opposite directions upon said rolls, other rolls journaled upon said frame and spaced from said first rolls, advertisement-bearing bands each wound partly upon one of said first-mentioned rolls and one of said other rolls, gearing connecting each of said first-mentioned rolls with one of said other rolls, said gearing including dog and ratchet devices, whereby said gearing is operative when said rolls are turned in predetermined directions only, means for guiding said advertisement-bearing bands, means for rotatably mounting said frame, a motor, gearing whereby said motor serves intermittently to rotate said frame, said gearing including means for operatively connecting said motor alternately with each of said first-mentioned rolls.

10. In a device of the class described, a frame, a pair of rolls journaled upon said frame and adjacent to each other, a flexible strip wound in opposite directions upon said rolls, other rolls journaled upon said frame at opposite sides of said first rolls and spaced therefrom, and advertisement-bearing bands, each wound upon one of said other rolls and one of said first-mentioned rolls, whereby the lengths of said advertisement-bearing bands simulate the appearance of a single band, said flexible strip serving to conceal the portions of said advertisement-bearing bands wound upon said first-mentioned rolls.

11. In a device of the class described, a frame, a plurality of rolls journaled upon said frame, two of said rolls being in juxtaposition, advertisement - bearing bands wound partly upon pairs of said rolls of said plurality, casings concealing said rolls other than said rolls in juxtaposition, a flexible band wound partly upon said rolls in juxtaposition, and serving to conceal portions of said first-mentioned band wound thereon, and means for actuating said rolls.

12. In a device of the class described, a frame comprising upper and lower members, spindles journaled between said members near the ends thereof, rolls carried by said spindles, further spindles journaled upon said members intermediate said first-mentioned spindles, rolls mounted upon said last-mentioned spindles, advertisement-bearing bands each wound partly upon one of said first and one of said last rolls, said spindles having gears, a pair of shafts journaled upon one of said members and having gears in mesh with a gear of one of said first spindles and a gear of one of said further spindles, dog and ratchet devices associated with said further spindles, whereby said first-mentioned spindles and said last-mentioned spindles are operatively connected when rotating in predetermined directions only, and means for actuating said last mentioned spindles.

13. In a device of the class described, a rotatable frame comprising upper and lower members, spindles journaled between said members near the ends thereof, rolls carried by said spindles, further spindles journaled upon said members intermediate said first-mentioned spindles, rolls mounted upon said last-mentioned spindles, advertisement-bearing bands each wound partly upon one of said first and one of said last mentioned rolls, said spindles having gears, a pair of shafts journaled upon one of said members and having gears in mesh with a gear of one of said first spindles and a gear of one of said further spindles, dog and ratchet devices associated with said further spindles, whereby said first-mentioned spindles and said last-mentioned spindles are operatively connected when rotating in predetermined directions only, a motor, gearing for intermittently connecting said motor with each of said last-mentioned spindles, and gearing for operatively connecting said motor and said frame, whereby said motor serves intermittently to rotate said frame.

14. In a device of the class described, a frame, rolls journaled upon said frame, other rolls journaled upon said frame and having a connecting, flexible band, advertisement-bearing bands wound partly upon said first rolls and said other rolls and partly concealed by said flexible band, means for intermittently and alternately driving said other rolls, means for operatively connecting each of said first-mentioned rolls with one of said other rolls, and tension devices associated with said first-mentioned rolls and serving to resist the unwinding of said advertisement-bearing bands therefrom.

15. A device of the class described, comprising a rotatable frame, rolls journaled thereon, advertisement-bearing bands wound upon said rolls, a motor, an actuating shaft driven by said motor, a clutch device for operatively connecting said actuating shaft and one of said rolls, automatic means for intermittently, operatively connecting said motor and said frame, and automatic, intermittently-operable means controlled by one of said rolls, for releasing said clutch device.

16. A device of the class described, comprising a rotatable frame, rolls journaled on said frame, advertisement-bearing bands wound upon said rolls, two of said rolls having clutch members, an actuating shaft having a socket adapted to be operatively engaged by either of said clutch members, a motor for driving said actuating shaft, gearing connecting said motor and said actuating shaft, automatically-operable means controlled by one of said rolls, for rendering said gearing intermittently inoperative, gearing connecting said motor and said frame, whereby said motor serves to rotate said frame, said last-mentioned gearing being normally inoperative, and means for rendering said last-mentioned gearing intermittently operative.

17. A device of the class described, comprising a base, a rotatable frame, a support for said frame journaled upon said base, an actuating member, a motor for driving said actuating member, means for intermittently, operatively connecting said support and said member, rolls journaled on said frame and having advertisement-bearing bands wound thereon, and means for operatively connecting said member and one of said rolls when said member and said support are in inoperative relation to one another.

18. A device of the class described, comprising a base, a rotatable frame, a supporting shaft for said frame journaled on said base, an actuating member, a motor for driving said member, means for periodically and intermittently rotating said shaft through 180°, rolls journaled on said frame and having advertisement-bearing bands wound thereon, means for operatively connecting said member and one of said rolls, and means controlled by certain of said rolls, for rendering said last-mentioned means intermittently inoperative.

19. A device of the class described, comprising a base, a supporting shaft journaled upon said base, a frame carried by said supporting shaft, rolls journaled on said frame and having advertisement-bearing bands wound thereon, a motor, a driving shaft connected with said motor, a main operating shaft connected with said driving shaft, a clutch for operatively connecting said main operating shaft and one of said rolls, a reversing device operable by said driving shaft, means for intermittently, operatively connecting said driving shaft, and said reversing device, said reversing device controlling said supporting shaft, and means controlled by one of said rolls, for operating said means for connecting said driving shaft and said reversing means.

20. A device of the class described, comprising a base, a supporting shaft journaled thereon, a frame carried by said shaft, rolls journaled on said frame, advertisement-bearing bands wound upon said rolls, a motor, a driving shaft connected with said motor, a reversing device operable by said driving shaft and normally inoperative with respect thereto, a main operating shaft connected with said reversing device, said device having means for rendering said operating shaft inoperative with respect to said rolls, and means controlled by said rolls for rendering said reversing device operative, said reversing device serving intermittently to rotate said supporting shaft.

21. A device of the class described, comprising a base, a supporting shaft journaled thereon, a frame carried by said shaft, rolls journaled on said frame, advertisement-bearing bands wound upon said rolls, a motor, a driving shaft connected with said motor, a main operating shaft movable in the direction of its length, a socket carried by said main operating shaft, certain of said rolls having clutch members adapted to be operatively received by said socket in a predetermined position of said operating shaft, a reversing device controlled by said rolls, means whereby said reversing device serves to move said operating shaft in the direction of its length, and means for operatively connecting said operating shaft and said supporting shaft when said operating shaft is inoperative with respect to said rolls.

22. A device of the class described, comprising a base, a supporting shaft journaled thereon, a frame carried by said shaft, rolls journaled on said frame, advertisement-bearing bands wound upon said rolls, a motor, a driving shaft connected with said motor, a main operating shaft for driving said rolls, a reversing device, a detent for holding said reversing device normally inoperative, means whereby certain of said rolls, at predetermined intervals release said detent, means whereby said reversing device serves intermittently to render said main operating shaft inoperative with respect to the rolls, and means controlled by said reversing device, for intermittently, operatively connecting said main operating shaft and said supporting shaft.

23. A device of the class described, comprising a base, a supporting shaft journaled thereon, a frame carried by said shaft, rolls journaled on said frame, advertisement-bearing bands wound upon said rolls, a motor, a driving shaft connected with said motor, a main operating shaft having means for driving certain of said rolls, a reversing device, a detent for holding said reversing device normally inoperative, a spring tending to render said reversing device operative, a trip controlled by one of said rolls for releasing said detent, means operable by said reversing device for rendering said main operating shaft operative and inoperative with respect to said rolls, and means controlled by said reversing device, for intermittently, operatively connecting said supporting shaft and said main operating shaft.

24. A device of the class described, comprising a base, a supporting shaft journaled thereon, a frame carried by said shaft, rolls journaled on said frame, advertisement-bearing bands wound upon said rolls, a motor, a driving shaft connected with said motor, a main operating shaft having means for driving certain of said rolls, a reversing device, a detent for holding said reversing device normally inoperative, a spring tending to render said reversing device operative, a trip controlled by one of said rolls, for releasing said detent, means operable by said reversing device for rendering said main operating shaft operative and inoperative with respect to said rolls, means controlled by said reversing device, for intermittently, operatively connecting said supporting shaft and said main operating shaft, and a lock controlled by said reversing device, for holding said supporting shaft against movement, said reversing device being operable from said driving shaft.

25. A device of the class described, comprising a base, a supporting shaft journaled thereon, a frame carried by said shaft, rolls journaled on said frame, advertisement-bearing bands wound upon said rolls, a motor, a driving shaft connected with said motor, a main operating shaft movable in the direction of its length and having a socket, certain of said rolls having clutch members adapted to be operatively received by said socket, a gear loosely carried by said supporting shaft, a reversing device, means controlled by said reversing device, for operatively connecting said gear and said supporting shaft, said gear being operatively connected with said operating shaft, means controlled by said reversing device for disengaging said operating shaft socket from each of said clutch members, and a trip controlled by said rolls, for rendering said device intermittently operative.

26. A device of the class described, comprising a base, a supporting shaft journaled thereon, a frame carried by said shaft, rolls journaled on said frame, advertisement-bearing bands wound upon said rolls, a motor, a driving shaft connected with said motor, a main operating shaft having means for operatively connecting with certain of said rolls, a reversing shaft, means for intermittently, operatively connecting said reversing shaft and said driving shaft, a detent normally holding said last-mentioned means inoperative, a trip connected with certain of said rolls and operable to release said detent, and means controlled by said reversing shaft, for operatively connecting said operating shaft and said supporting shaft.

27. A device of the class described, comprising a base, a frame rotatably mounted upon said base, rolls journaled upon said frame, a motor, means for operatively connecting said motor and certain of said rolls, said rolls having advertisement-bearing bands wound thereon, a reversing device for intermittently, operatively connecting said motor and said frame, to rotate said frame bodily, and trips for controlling said reversing device, certain of said rolls being operatively connected with said trips, whereby one of said trips are actuated when said rolls are actuated.

28. A device of the class described, comprising a base, a frame rotatably mounted upon said base, rolls journaled upon said frame, a motor, means for operatively connecting said motor and certain of said rolls, said rolls having advertisement-bearing bands wound thereon, a reversing device for intermittently, operatively connecting said motor and said frame, to rotate said frame bodily, certain of said rolls each having a threaded extension, and trips each having a correspondingly threaded part associated with said threaded extension of one of said rolls, whereby said trips are moved in the direction of the lengths of said rolls when said rolls are actuated, said trips controlling said reversing device.

29. A device of the class described, comprising a base, a supporting shaft journaled thereon, a frame carried by said shaft, advertisement-bearing bands arranged to travel upon said frame, a motor, a driving shaft connected with said motor, a main operating shaft, means for actuating said band from said main operating shaft, a gear normally loose upon said supporting shaft, gearing connecting said gear and said main operating shaft, a clutch device for operatively connecting said supporting shaft and said gear, and an intermittently operable reversing device controlling said clutch device.

30. A device of the class described, comprising a base, a supporting shaft journaled thereon, a frame carried by said shaft, rolls journaled on said frame, advertisement-bearing bands wound upon said rolls, a motor, a driving shaft connected with said motor, a main operating shaft having means for actuating certain of said rolls, a gear loose upon said supporting shaft, gearing connecting said gear and said main operating shaft, a clutch device for operatively connecting said gear and said supporting shaft, a reversing shaft controlling said clutch device, trip mechanism controlled by certain of said rolls, for intermittently rendering said reversing device operative, and means controlled by said reversing device, for intermittently disconnecting said main operating shaft and said rolls.

31. A device of the class described, comprising a base, a supporting shaft journaled thereon, a frame carried by said shaft, rolls journaled on said frame, advertisement-bearing bands wound upon said rolls, a motor, a driving shaft connected with said motor, a main operating shaft having means for operatively connecting with certain of said rolls, a gear loose upon said supporting shaft, gearing operatively connecting said gear and said main operating shaft, said main operating shaft being movable in the direction of its length, whereby it can be disconnected from said rolls, a reversing shaft, means for intermittently, operatively connecting said reversing shaft and said driving shaft, means for operatively connecting said reversing shaft and said main operating shaft, whereby said reversing shaft serves to render said main operating shaft operative and inoperative with respect to said rolls, a detent normally holding said last mentioned means inoperative, a clutch device for operatively connecting said gear and said supporting shaft, and a trip device controlled by said rolls and operable to release said detent, said reversing device controlling said clutch device for operatively connecting said gear and said supporting shaft.

32. A device of the class described, comprising a base, a frame journaled upon said base and having movable advertisement-bearing bands, a motor, driving shaft actuated by said motor, means for operatively connecting said driving shaft and said bands, a reversing shaft, a normally inoperative gear carried by said reversing shaft, a gear carried by said driving shaft and adapted to mesh with said first gear, means controlled by said bands, for rendering said normally inoperative gear operative, and means controlled by said reversing shaft, for operatively connecting said driving shaft and said frame, to rotate said frame.

33. A device of the class described, comprising a base, a frame journaled upon said base and having movable advertisement-bearing bands, a motor, a driving shaft actuated by said motor, means for operatively connecting said driving shaft and said bands, a reversing shaft, a normally inoperative gear carried by said reversing shaft, a gear carried by said driving shaft and adapted to mesh with said first gear, means controlled by said bands, for rendering said normally inoperative gear operative, gearing for operatively connecting said driving shaft and said frame, to rotate said frame, means operable by said reversing shaft, for controlling said gearing, and means operable by said reversing shaft, for connecting and disconnecting said driving shaft and said bands.

34. A device of the class described, comprising a base, a supporting shaft journaled thereon, a frame carried by said shaft, advertisement-bearing bands arranged to move upon said frame, a motor, a driving shaft actuated thereby, connecting means for intermittently connecting said driving shaft and said bands, a reversing shaft having a gear provided with a movable section, a gear upon said driving shaft and adapted to mesh with said first gear, said movable section being normally inoperative, whereby said driving shaft and said reversing shaft are normally, relatively inoperative, trip mechanism controlled by said bands, for rendering said movable section operative, means controlled by said reversing shaft for operatively connecting said driving shaft and said supporting shaft, and means controlled by said reversing shaft, for returning part of said trip mechanism to a normal position.

35. A device of the class described, comprising a base, a supporting shaft journaled thereon, a frame carried by said shaft, advertisement-bearing bands arranged to move upon said frame, a motor, a driving shaft actuated thereby, connecting means for intermittently connecting said driving shaft and said bands, a reversing shaft having a gear provided with a movable section, a gear upon said driving shaft and adapted to mesh with said first gear, said movable section being normally inoperative, whereby said driving shaft and said reversing shaft are normally, relatively inoperative, trip mechanism controlled by said bands, for rendering said movable section operative, means controlled by said reversing shaft for operatively connecting said driving shaft and said supporting shaft, means controlled by said reversing shaft, for returning part of said trip mechanism to a normal, inoperative position, means controlled by said reversing shaft for disconnecting said driving shaft and said bands, and means for normally locking said supporting shaft against rotation.

36. A device of the class described, comprising a base, a supporting shaft journaled thereon, a frame carried by said shaft, rolls journaled on said frame, advertisment-bearing bands wound upon said rolls, a motor, a driving shaft connected with said motor and having a gear, a main operating shaft having means for operatively connecting with certain of said rolls, a reversing shaft having a gear provided with a movable, normally inoperative section and adapted to mesh with said gear of said driving shaft, trip mechanism controlled by said rolls, for rendering said normally inoperative section of said gear operative, said reversing shaft itself having means for setting said trip mechanism, means controlled by said reversing shaft for operatively connecting said main operating shaft and said supporting shaft, and means controlled by said reversing shaft for connecting and disconnecting said main operating shaft and said rolls.

37. A device of the class described, comprising a base, a supporting shaft journaled thereon, a frame carried by said shaft, rolls journaled on said frame, advertisement-bearing bands wound upon said rolls, a motor, a driving shaft connected with said motor and having a gear, a main operating shaft having a socket, certain of said rolls having clutch members adapted to be operatively received by said socket, a reversing shaft having a gear provided with a movable, normally inoperative section and adapted to mesh with said gear of said driving shaft, trip mechanism including a trip lever for rendering said normally inoperative section operative, a trip device associated with each of said certain rolls, and adapted to actuate said trip lever, said reversing shaft having means for rendering a part of said trip mechanism inoperative, means controlled by said reversing shaft for connecting and disconnecting said socket and said clutch members, and means controlled by said reversing shaft for intermittently, operatively connecting said main operating shaft and said supporting shaft.

38. A device of the class described, comprising a base, a supporting shaft journaled thereon, a frame carried by said shaft, rolls journaled on said frame, advertisement-bearing bands wound upon said rolls, a motor, a driving shaft connected with said motor and having a gear, a main operating shaft having a socket, certain of said rolls having clutch members adapted to be operatively received by said socket, a reversing shaft having a gear provided with a movable, normally inoperative section and adapted to mesh with said gear of said driving shaft, trip mechanism including a trip lever for rendering said normally inoperative section operative, a trip device associated with each of said certain rolls, and adapted to actuate said trip lever, a gear loose upon said supporting shaft, gearing connecting said gear and said main operating shaft, a clutch device for operatively connecting said gear and said supporting shaft, means whereby said reversing shaft controls said clutch device, said main operating shaft being movable in the direction of its length, whereby said socket and said clutch members can be connected and disconnected, and means controlled by said reversing shaft, for moving said main operating shaft in the direction of its length.

39. A device of the class described, comprising a base, a frame mounted to swing upon said base and having advertisement-bearing bands arranged to move thereon, a motor having a driving shaft, means for operatively connecting said driving shaft and said band, said driving shaft having a gear, a reversing shaft having a gear, said gear of said reversing shaft having a part cut away, a yoke mounted to swing upon said reversing shaft and having a part provided with teeth, adapted to extend into said cut away part of said last-mentioned gear to complete the same, said yoke being normally inoperative, a detent, a rock shaft having an arm, adapted to engage said yoke to render the same operative, a spring controlling said rock shaft. a trip device controlled by said bands and adapted to release said detent, and means controlled by said reversing shaft and intermittently, operatively connecting said driving shaft and said frame, to rotate said frame, said detent coöperating with said rock shaft to hold the latter inoperative.

40. A device of the class described, comprising a base, a frame mounted to swing upon said base and having advertisement-bearing bands arranged to move thereon, a motor having a driving shaft, means for operatively connecting said driving shaft and said bands, said driving shaft having a gear, a reversing shaft having a gear, said gear of said reversing shaft having a part cut away, a yoke mounted to swing upon said reversing shaft and having a part provided with teeth, adapted to extend into said cut away part of said last-mentioned gear to complete the same, said yoke being normally inoperative, a rock shaft having an arm adapted to engage said yoke to render the same operative, a detent for holding said rock shaft normally inoperative, a spring controlling said rock shaft, a trip device controlled by said bands and adapted to release said detent, means controlled by said reversing shaft and intermittently, operatively connecting said driving shaft and said frame, to rotate said frame, said reversing shaft having means for rocking said rock shaft to render said detent operative with regard to it, and means controlled by said frame, for releasing said detent.

41. A device of the class described, comprising a base, a supporting shaft journaled thereon, a frame carried by said shaft, advertisement-bearing bands arranged to move upon said frame, a motor having a driving shaft, means for operatively connecting said driving shaft and said bands, a reversing shaft having a normally inoperative gear, a gear on said driving shaft, in mesh with said first-mentioned gear, a rock shaft having means for rendering said normally inoperative gear operative, a detent for holding said rock shaft normally inoperative, a trip lever controlling said detent, a trip device controlled by said band, for operating said lever, a gear loose upon said supporting shaft, gearing connecting said gear and said motor, a clutch device for operatively connecting said gear and said supporting shaft, means operatively connecting said clutch device and said reversing shaft, means on said reversing shaft, for rendering said rock shaft inoperative, means controlled by said reversing shaft, for connecting and disconnecting said driving shaft and said bands, and means operable by said supporting shaft, for releasing said detent.

42. A device of the class described, comprising a base, a supporting shaft journaled thereon, a frame carried by said shaft, advertisement-bearing bands arranged to move upon said frame, a motor having a driving shaft, means for operatively connecting said driving shaft and said bands, a reversing shaft having a normally inoperative gear, a gear on said driving shaft, in mesh with said first-mentioned gear, a rock shaft having means for rendering said normally inoperative gear operative, a detent for holding said rock shaft normally inoperative, a trip lever controlling said detent, a trip device controlled by said bands, for operating said lever, a gear loose upon said supporting shaft, gearing connecting said gear and said motor, a clutch device for operatively connecting said gear and said supporting shaft, means operatively connecting said clutch device and said reversing shaft, means on said reversing shaft, for rendering said rock shaft inoperative, means controlled by said reversing shaft, for connecting and disconnecting said driving shaft and said bands, means operable by said supporting shaft, for releasing said detent, a lever adapted to lock said supporting shaft against movement, means operatively connecting said lever and said reversing shaft, and means controlled by said supporting shaft, for locking said detent against movement.

43. A device of the class described, comprising a base, a supporting shaft journaled thereon, a frame carried by said shaft, rolls journaled on said frame, advertisement-bearing bands wound upon said rolls, a motor, a driving shaft actuated thereby, a main operating shaft having a socket, and movable in the direction of its length, certain of said rolls having clutch members adapted to be operatively received by said socket, a gear loose upon said supporting shaft, a clutch device for operatively connecting said gear and said supporting shaft, gearing connecting said gear and said main operating shaft, a pivoted arm connected with said main operating shaft, a reversing shaft operatively connected with said arm and having a normally inoperative gear, a gear carried by said driving shaft and adapted to mesh with said first-mentioned gear, a rock shaft having means for rendering said normally inoperative gear operative, a detent for holding said rock shaft normally inoperative, means whereby said reversing shaft controls said clutch device, and a trip adapted to be operated by certain of said rolls, for releasing said detent.

44. A device of the class described, comprising a base, a supporting shaft journaled thereon, a frame carried by said shaft, rolls journaled on said frame, advertisement bearing bands wound upon said rolls, a motor, a driving shaft actuated thereby, a main operating shaft having a socket, and movable in the direction of its length, certain of said rolls having clutch members adapted to be operatively received by said socket, a gear loose upon said supporting shaft, a clutch device for operatively connecting said gear and said supporting shaft, gearing connecting said gear and said main operating shaft, a pivoted arm connected with said main operating shaft, a reversing shaft operatively connected with said arm and having a normally inoperative gear, a gear carried by said driving shaft and adapted to mesh with said normally inoperative gear, a rock shaft having means for rendering said normally inoperative gear operative, a detent for holding said rock shaft normally inoperative, means whereby said reversing shaft controls said clutch device, a lever controlling said detent, trips operatively connected with certain of said rolls and each adapted to actuate said lever, and means carried by said reversing shaft, for rendering said rock shaft inoperative.

45. A device of the class described, comprising a base, a supporting shaft journaled thereon, a frame carried by said shaft, rolls journaled on said frame and having threaded extensions, advertisement-bearing bands wound upon said rolls, a motor, a driving shaft actuated thereby, a main operating shaft having a socket and movable in the direction of its length, certain of said rolls having clutch members adapted to be operatively received by said socket, a gear loose upon said supporting shaft, gearing connecting said gear and said main operating shaft, a pivoted arm connected with said main operating shaft, a reversing shaft operatively connected with said arm, a clutch device for connecting said gear with said supporting shaft, an operative connection between said reversing shaft and said clutch device, said driving shaft having a pinion, a gear carried by said reversing shaft and adapted to mesh with said pinion, said last-mentioned gear having a cut away part, a yoke pivotally mounted upon said reversing shaft and having a part provided with teeth adapted to complete said gear of said reversing shaft at said cut away part, a spring-controlled rock shaft having means for engaging said yoke to render the same operative, a detent for holding said rock shaft normally inoperative, said reversing shaft having means for operating said rock shaft to bring it into engagement with said detent, collars mounted upon said threaded parts of said rolls, trips carried by said collars, a trip lever controlling said detent and adapted to be operated by said trips, and means controlled by said main supporting shaft, for releasing said detent.

46. A device of the class described, comprising a base, a supporting shaft journaled upon said base, a frame carried by said shaft, advertisement-bearing bands arranged to move upon said frame, a motor, a driving shaft actuated thereby, a main operating shaft having means for actuating said bands, a reversing shaft, means whereby said driving shaft serves to operate said reversing shaft intermittently, a second shaft, said main operating shaft being movable in the direction of its length, whereby it can be rendered operative and inoperative with respect to said bands, a pivoted arm connected with said main operating shaft, a crank and link connection between said second shaft and said pivoted arm, an operative connection between said reversing shaft and said second shaft, means whereby said bands control said reversing shaft, and means whereby said supporting shaft controls said reversing shaft.

47. A device of the class described, comprising a base, a supporting shaft journaled upon said base, a frame carried by said shaft, advertisement-bearing bands arranged to move upon said frame, a motor, a driving shaft actuated thereby, a main operating shaft having means for actuating said bands, a reversing shaft, means whereby said driving shaft serves to operate said reversing shaft intermittently, a second shaft, said main operating shaft being movable in the direction of its length, whereby it can be rendered operative and inoperative with respect to said bands, a pivoted arm connected with said main operating shaft, a crank and link connection between said second shaft and said pivoted arm, an operative engagement between said reversing shaft and said second shaft, trip mechanism controlled by said bands, for rendering said connecting means between said driving shaft and said reversing shaft operative, means whereby said supporting shaft controls said reversing shaft, and means for intermittently connecting said supporting shaft and said driving shaft to rotate said supporting shaft, said last-mentioned means being controlled by said reversing shaft.

48. A device of the class described, comprising a base, a supporting shaft journaled thereon, a frame carried by said shaft, bands arranged to move upon said frame, a motor having a driving shaft, means connecting said driving shaft and said bands, means for intermittently connecting said driving shaft and said supporting shaft, to rotate said frame, a reversing shaft controlling said last-mentioned means, and means controlled by said reversing shaft, for assisting in the rotation of said supporting shaft, independently of said connection between said driving shaft and said supporting shaft.

49. A device of the class described, comprising a base, a supporting shaft journaled thereon, a frame carried by said supporting shaft, advertisement-bearing bands arranged to move upon said frame, a motor having a driving shaft, means for operatively connecting said driving shaft and said bands, a reversing shaft, means for intermittently, operatively connecting said reversing shaft and said driving shaft, means controlled by said reversing shaft, for operatively connecting said main supporting shaft and said driving shaft, lugs rigid with said supporting shaft, an arm controlling said reversing shaft and operable by said lugs, a locking member for holding said supporting shaft against movement, a second shaft operatively connected with said reversing shaft and controlling said locking member, and means controlled by said bands, for operating said reversing shaft.

50. A device of the class described, comprising a supporting shaft, a frame having advertisement-bearing bands, a motor, means for causing said bands to be actuated by said motor, said supporting shaft having lugs, a locking member adapted to engage said lugs to hold said shaft, a reversing device controlled by said bands, a detent controlling said reversing device, and a member for locking said detent, and operable by said lugs to release the detent.

51. A device of the class described, comprising a supporting shaft having a loose gear, a frame carried by said supporting shaft and having advertisement-bearing bands arranged to move thereon, a motor, a main operating shaft movable in the direction of its length to bring it into and out of operative relation with said bands and actuated by said motor, said main operating shaft having means for driving said bands, gearing connecting said gear and said main operating shaft, a clutch device carried by said supporting shaft and adapted to connect said gear and said supporting shaft operatively, a member carried by said main operating shaft and controlling said clutch device, a reversing device controlled by said band, and means whereby said reversing device can reciprocate said main operating shaft and can bring said clutch device into operative relation with said loose gear.

52. A device of the class described, comprising a rotatable frame, rolls journaled upon said frame, and carrying clutch members having limited movements, an operating shaft, a motor for driving said operating shaft, said operating shaft having a socket adapted to receive said clutch members, whereby said operating shaft and said rolls can be operatively connected, and automatic means for controlling said operating shaft.

53. A device of the class described, comprising a base, a supporting shaft journaled thereon, a frame carried by said supporting shaft, pairs of rolls journaled upon said frame and having advertisement-bearing bands wound thereon, certain of said rolls having extensions provided with clutch members, a main operating shaft having a socket adapted to receive said clutch members, a motor for driving said operating shaft, means for intermittently rotating said frame, means for rendering said operating shaft inoperative with respect to said rolls while said frame is being rotated, and a reversing device controlling the rotation of said frame.

54. A device of the class described, comprising a base, a supporting shaft journaled thereon, a frame carried by said supporting shaft, pairs of rolls journaled upon said frame and having advertisement-bearing bands wound thereon, certain of said rolls having extensions provided with clutch members, a main operating shaft having a socket adapted to receive said clutch members, a motor for driving said operating shaft, a flexible band wound in opposite directions upon said rolls having said clutch members, an operative connection between each of said rolls having said clutch members and another of said rolls, means for intermittently, operatively connecting said main operating shaft and said supporting shaft, and a reversing device operable by said rolls and controlling said last-mentioned means.

In testimony whereof I have signed my name to this specification in the presence of two subscribing witnesses.

HENRY A. ARMSTRONG.

Witnesses:
JOHN K. BRACHVOGEL,
PHILIP D. ROLLHAUS.

Copies of this patent may be obtained for five cents each, by addressing the "Commissioner of Patents, Washington, D. C."